United States Patent [19]

Kowalski et al.

[11] 4,295,588
[45] Oct. 20, 1981

[54] SLOTTED SIDE RAIL AND MOVABLE BRACKET FOR ARTICLE CARRIER

[75] Inventors: Daniel J. Kowalski, Ortonville; Ray G. Mareydt, Warren, both of Mich.

[73] Assignee: Four Star Corporation, Troy, Mich.

[21] Appl. No.: 71,938

[22] Filed: Sep. 4, 1979

[51] Int. Cl.³ .............................................. B60R 9/00
[52] U.S. Cl. .................... 224/321; 224/325; 414/462
[58] Field of Search ............... 224/321, 309, 322, 324, 224/325, 326, 327; 414/462; 248/222.4, 223.1; 280/769

[56] References Cited

U.S. PATENT DOCUMENTS

| Re. 26,539 | 3/1969 | Bott | 224/321 |
|---|---|---|---|
| 3,330,454 | 7/1967 | Bott | 224/321 X |
| 3,519,180 | 7/1970 | Bott | 224/321 |
| 4,015,760 | 4/1977 | Bott | 224/324 |
| 4,132,335 | 1/1979 | Ingram | 224/324 |
| 4,133,465 | 1/1979 | Bott | 224/326 X |

Primary Examiner—Steven M. Pollard
Attorney, Agent, or Firm—Reising, Ethington, Barnard, Perry & Brooks

[57] ABSTRACT

A slotted side rail and cross-rail receiving bracket assembly for association with an article carrier, such as a luggage carrier, is disclosed. A slidable cross-rail is supported between a pair of cross-rail receiving brackets and is movable with the brackets along the slotted side rail. Each bracket includes a rail engaging lock for locking the bracket anywhere along the length of the slotted side rail. The lock prevents unintended loosening of the bracket and resultant movement of the bracket along the side rail.

2 Claims, 5 Drawing Figures

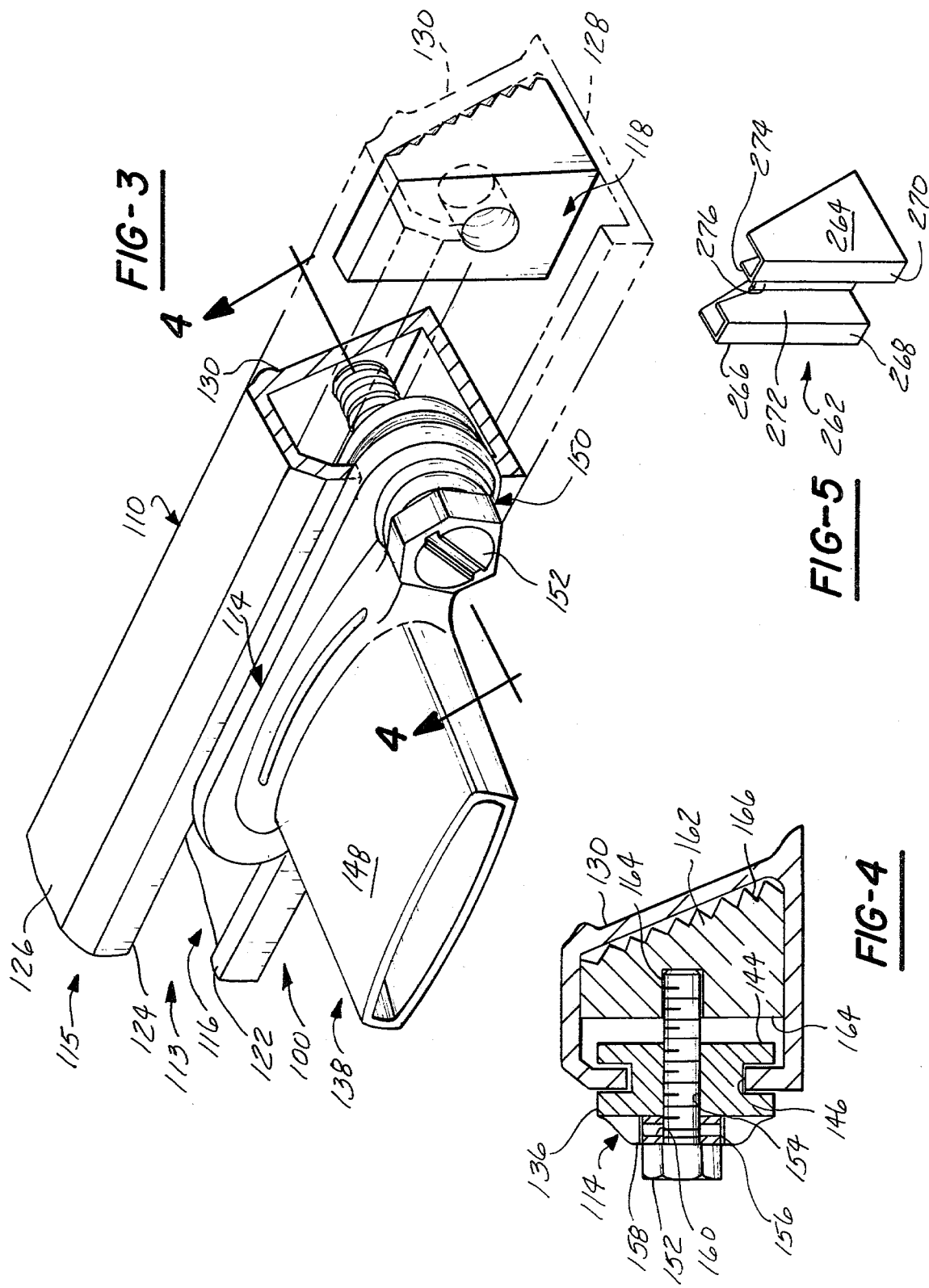

SLOTTED SIDE RAIL AND MOVABLE BRACKET FOR ARTICLE CARRIER

BACKGROUND OF THE INVENTION

I. Field of the Invention

The present invention pertains to a slotted side rail configuration which receives an adjustable bracket. More particularly, the present invention pertains to a slotted side rail and an adjustably positionable bracket associated therewith for vehicle-related article carriers. Even more particularly, the present invention concerns a side rail configured to receive an adjustably positionable bracket for vehicle-associated luggage racks.

II. Cross Reference to Related Applications

This application is related to copending application entitled "Article Carrier Comprising Slotted Side Rail With Slidable Cross Rail and Bracket Therefore", Ser. No. 046,995, Filed June 11, 1979 and now U.S. Pat. No. 4,239,138.

III. Prior Art Statement

U.S. Pat. No. 3,330,454 discloses a luggage rack employing a movable cross-rail releasably interconnected at its ends to a pair of spaced apart longitudinal rails. The cross-rail ends are releasably interconnected to the longitudinal rail by means of a slide block slidingly retained in a recess within the longitudinal rail. A threaded fastener passes through an aperture in a cross-rail support and threadingly engages an aperture formed in the slide block. Tightening the fasteners forces the cross-rail support against a wall of the longitudinal rail to retain the support in a fixed position. U.S. Pat. No. 3,519,180 discloses a cross-rail movable along a side rail and releasably attached thereto. A recess spaced in from an end of the cross-rail is formed to be slidingly received by a longitudinal opening formed along an inside wall of the side rail. The cross-rail is threaded inward from the recess to threadingly engage a rotatable collar. Tightening of the collar forces the collar against the inside wall of the side rail to retain the cross-rail.

Both of the above listed United States Patents disclose a means for releasably locking the cross-rail to the side rail by pinching or squeezing a wall of the side rail. The present invention, as will be disclosed more fully hereinbelow, urges a bolt into abutment with a wall formed in the side rail to lock the cross-rail in position. The bracket of the present invention employs the slotted side rail of the copending parent application which provides a seat for locking the bracket in position, as well as an alternate slotted side rail configuration. The copending application and its references are hereby incorporated by reference.

SUMMARY OF THE INVENTION

In accordance with the present invention, there is provided a slotted side rail configured to receive an adjustably positionable bracket for an article carrier, wherein the bracket is locked or prevented against unintended movement. The slotted side rail hereof generally comprises:

(a) an elongated member including an inside wall and an upper wall;

(b) a slot formed along the inside wall of the rail and configured to slidingly receive an adjustably, positionable bracket; and (c) an interior wall for locking engagement with the bracket.

The side rail may, also, include a stanchion engaging recess formed at the ends thereof.

The bracket hereof generally comprises:

(a) means for variably and adjustably positioning the bracket along the slot provided in the side rail;

(b) an inner section interconnected to the positioning means;

(c) a locking means for locking the bracket in position; and (d) means for receiving a cross-rail.

The stanchion hereof generally comprises:

(a) a bottom wall mounted to and conforming to the vehicle surface;

(b) a vertical structure having one open side and a front and rear wall curving gently toward the rail, tapering to a narrowed top; and (c) a rail engaging projection extending from the top portion of the stanchion to slidingly engage and support an end portion of the side rail.

An opposed pair of stanchions optionally, support the rail longitudinally along a surface of the vehicle.

As contemplated by the practice of the present invention, the bracket hereof comprises a slide plate or base adapted to be slidingly disposed in the slot formed in the side rail.

The bracket locking means hereof, preferably, includes a rotatable bolt which is threadingly engagable with the bracket and which extends through the positioning means. As the bolt is rotated in a first direction, a threaded end of the bolt is urged into engagement with the interior wall of the side rail to lock the bracket in position. Rotation of the bolt in a counter or second direction disengages the threaded end from the wall to permit movement of the bracket.

For a more complete understanding of the present invention, reference is made to the following detailed description and accompanying drawings. In the drawings like reference characters refer to like parts throughout the several views, in which:

BRIEF DESCRIPTION OF THE DRAWINGS

FIG. 3 is a broken perspective, exploded view of an alternate embodiment of the slotted side rail and bracket of the present invention;

FIG. 4 is a cross sectional view of the alternate embodiment taken along the lines 4—4 of FIG. 3; and FIG. 5 illustrates an alternate embodiment employing a slide block formed from sheet metal.

DESCRIPTION OF THE PREFERRED EMBODIMENT

Figures 1, 2:
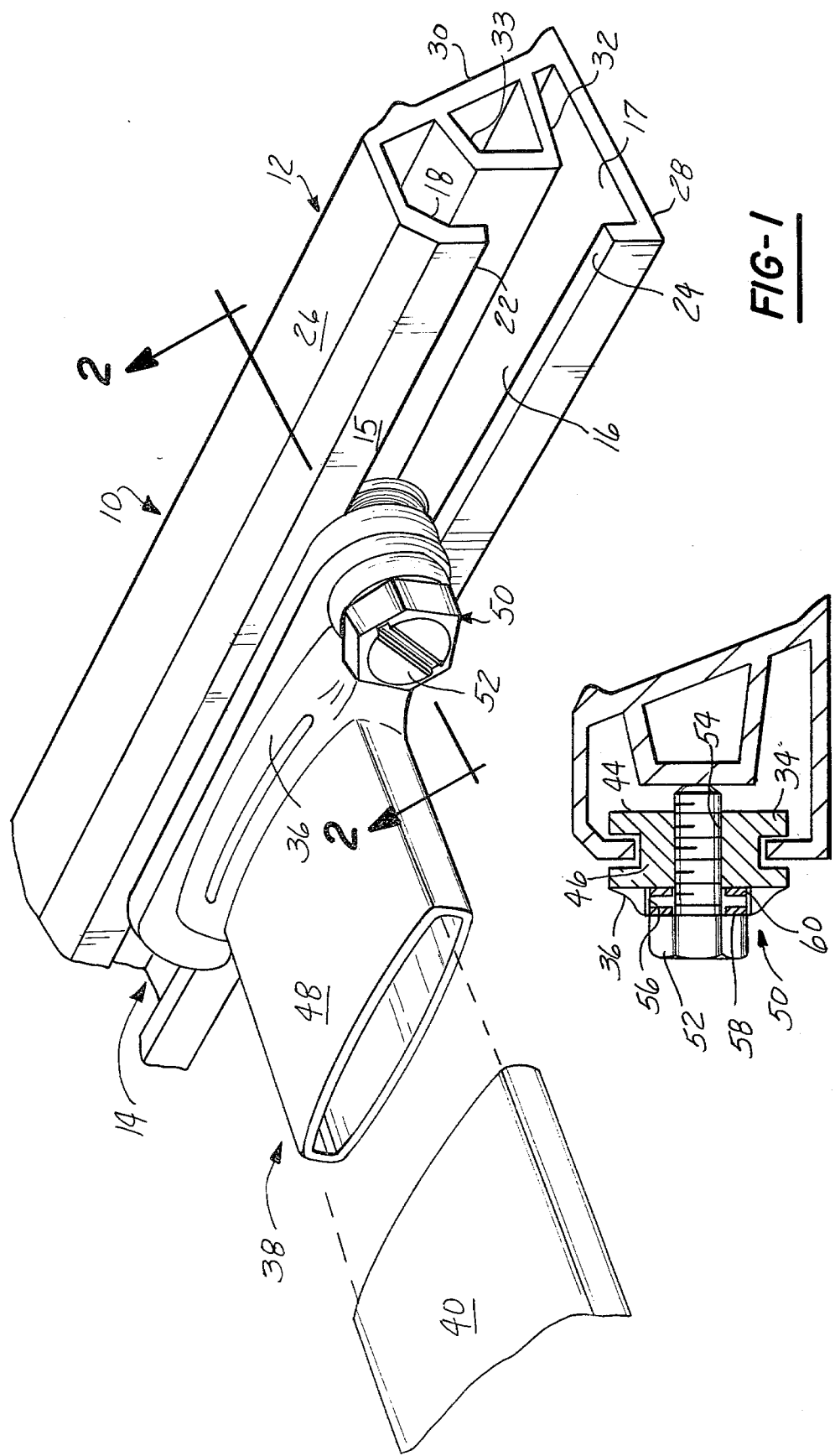
FIG. 1 is a broken perspective view of a slotted side rail and bracket in accordance with the present invention.
FIG. 2 is a cross sectional view of the rail and bracket of FIG. 1 taken along the lines 2—2 of FIG. 1.

Referring now to the drawings, and, in particular, FIGS. 1 and 2 there is depicted therein a preferred embodiment of the present invention. As defined by the present invention, an article carrier 10 comprises at least one side rail 12 adapted to receive a cross-rail receiving bracket 14 in accordance with the present invention. An inner surface 15 of the side rail 12 is provided with a bracket receiving means 14. The bracket receiving means 17 comprises a slot or channel 16. The channel or slot 16, in a preferred embodiment, is formed longitudinally substantially along the extent of the inner surface 16 of the side rail. The slot 16 is in registry with and opens up into an enlarged guide path 18. The guide path 18 is coextensive with the slot 16. The guide path 18 includes an interior wall 20 which defines a seat for the bracket 14 in a manner to be described subsequently. The junction between the slot 16 and the guide path 18 is defined by a pair of opposed, inwardly directed shoulders 22,24 respectively. The shoulder 22 is integral with a top wall 26, and the shoulder 24 is integral with a bottom wall 28. The top and bottom walls are integral with an outer wall 30 which encloses the side rail to form an integral structure. A pair of flanges 32,33 project inward from the outer wall 30 to support the interior wall 20 along their inside end thereof. As will subsequently be described the wall 20 and the shoulders 22,24 cooperate to retain the bracket 14 in a fixed position when the bracket is placed in a locked position.

The side rail 12 further comprises means for limiting the longitudinal movement of the bracket 14 in the slot 16. For example, the limiting or stop means can comprise a stanchion 32 journalled onto one end of the side rail 12. It should be noted that the side rail 12 can comprise a formed sheet metal member, a solid or hollow interior extrusion or the like, as desired. The criticality to be attached to the side rail 12 is that it be provided with the longitudinally extending slot 16.

Where used, each stanchion 32 generally, comprises a bottom wall conforming to and mounted to the vehicle surface. A front and rear wall extend upward from the bottom wall, curving gently toward the rail and tapering toward the upper portion thereof. A projection at the top of the bracket is journalled into an opening or recess formed at each end of the rail. The recess defines a support for an associated stanchion.

As heretofore noted, the side rail 12 receives the bracket 14. The bracket 14 generally comprises:

(a) a base section 34 for adjustably positioning the bracket along the extent of the slot 16;

(b) an inner section 36 integral with the base; and (c) means for selectively locking the bracket in position.

The bracket hereof, also, comprises means 38 for detachably mounting an article carrier cross-rail 40 thereto.

With more particularity, the base section 34 is slidably movable in the slot 16. Thus, the base section is configured to fit and slide in the slot 16. Preferably, the base section includes an interior body 44 analogously configured to, but being dimensionally slightly less than that of the guide path 18. This dimensioning enables the interior body 44 to be slid, easily, along the length of the guide path. The body 44 can have other configurations as long as it can slide within the track.

A shank 46 projects inwardly from the interior body 44 and is integrally formed therewith. The shank 46 is disposed substantially perpendicular to the interior body and centrally thereof. The shank 46 is coextensive with the inner section along the longitudinal extent thereof. The shank 46 has a width slightly less than that of the slot 16 and projects therethrough and therebeyond, as shown.

It is to be appreciated that the base defines means for variably adjustably positioning the bracket, per se, along the extent of the track.

The inner section 36 is integrally formed with the base section 34 and is united therewith at the junction of the shank 46 with the outer end of the inner section 36. The inner section is substantially equal in length to the base. As shown in the drawings, the inner section has an elongated configuration which may include means for receiving an article carrier tie-down device. A projection 48 extending inward from the bracket provides the means 38 for mounting a cross rail 40.

Referring again to the drawings, as heretofore noted, in order to set the bracket in any position along the length of the associated side rail, the present invention further comprises means 50 for releasably locking the bracket 14 in position. The locking means 50 generally comprises a rotatable bolt 52 threadingly engaging a threaded aperture 54 in the bracket.

The bracket inner section 36 extends longitudinally along the inner surface 16 and the threaded aperture 54 is disposed at one end thereof. The threaded aperture extends through the inner section 36, the shank 46, and the base section 34. The threaded aperture 54 enlarges at the inner section 36 to form a circular recess 56, which will be described more fully hereinbelow.

The other end of the inner section 36 supports the projection 48 comprising the means 38 for supporting a cross-rail 40. The projection 48 may include a form configured to snugly enter a recess formed in an end of the cross-rail 40; or the means 38 may comprise a recess formed to snugly surround an end of the cross-rail 40.

The bolt 52 is a standard hex-head threaded fastener with a slotted head which is rotatable by either a wrench or screwdriver. The circular recess 56 is sufficiently large to clear the corners of the head of the bolt 52. A spring 58 is interposed the bolt head and a bottom wall 60 of the recess to provide friction against rotation of the bolt and prevent unintended loosening of the bracket.

The locking means 50 is activated by threadingly engaging the bolt 52 in the aperture 54 with the spring 58 interposed the bolt head and the bottom wall 60. Rotation of the bolt 52 in a first direction engages a threaded end of the bolt with the interior wall 20 to urge the interior body 44 against the inwardly directed shoulders 22,24 to lock the bracket in place. Rotation of the bolt in a second or counter direction releases the threaded end from contact with the interior wall allowing the bracket 14 to be slid along the side rail 12.

Referring, again to the drawings, and in particular to FIGS. 3 and 4 wherein there is illustrated an alternate embodiment of the slotted side rail and bracket of the present invention. The alternate embodiment comprises at least one slotted side rail 110 adapted to receive a cross-rail receiving bracket 114. An inner surface 115 of the side rail 110 is provided with a bracket receiving means 113 comprising a slot or channel 116. The slot 116 in a preferred embodiment is formed substantially along the extent of the inner surface 115 and is in registry with and opens up to an enlarged guide path 118. The guide path is coextensive with the slot 116. The junction between the slot 116 and the guide path 118 is defined by a pair of inwardly directed shoulders 122,124. The shoulder 122 is integral with a bottom wall 128, and the shoulder 124 is integral with a top wall 126. The top and bottom walls are integral with an outer wall 130 which slants downward and outward between the top and bottom walls to form an integral structure.

The rail receiving bracket 114 is slidable within the guidepath 118 and includes an interior body 144 analogously configured to but slightly less than that of the guide path 118. This dimensioning enables the interior body to be slid easily along the length of the guide path.

A shank 146 projects inwardly from the interior body 144 and passes through and is slightly less than the slot 116. The shank is integral with a bracket inner section 136 which extends along the inner wall 115 of the rail. As shown in FIG. 3 the inner section 136 has an elongated configuration which may include a means for receiving an article tie down device. A projection 148 extending inward from the inner section provides a means 138 for mounting a cross rail 140. The bracket 114 also includes a means 150 which will be described more fully hereinbelow, for releasably locking the bracket in position along the rail.

The cross rail mounting means is formed at one end of the bracket, and a threaded aperture 154 formed at the other end of the bracket extends through the inner section, the shank and the interior body. A hex head bolt 152 threadingly engages the threaded aperture. An inner end of the threaded aperture 154 enlarges to a diameter to clear the corners of the bolt head forming a circular recess 156. A spring 158 is interposed the bolt head and a bottom wall 160 of the recess to provide friction and prevent unintended loosening of the bolt. A slide block 162 is configured to conform to and be slightly less than the interior of the rail. An inner wall 164 of the slide block is perpendicular to the axis of the bolt and positioned a distance from the inner section providing clearance. A central bore 164 formed in the slide block slidingly engages a threaded end of the bolt to be retained thereby and move longitudinally with the bracket.

To activate the locking means 150 the bolt 152 is threadingly engaged with the threaded aperture 154, the slide block bore is slid over the threaded end of the bolt and the assembly is inserted into the slot 116. The bracket 114 is positioned along the rail and rotation of the bolt in a first direction urges the slide block 162 into engagement with the outer wall 130 locking the bracket in position. Rotation of the bolt in a second direction releases the slide block 162 from engagement with the outer wall and the bracket is released for movement along the rail. An outer wall 166 of the slide block is optionally serrated to aid in gripping the outer wall 130 to prevent unintended movement of the bracket.

FIG. 5 illustrates an alternate embodiment of a slide block 262. The slide block 262 is formed from sheet metal by stamping or other suitable metal forming means. The slide block 262 comprises a pair of opposed side walls 264, 266 integral with a pair of interior walls 268, 270. The side walls 264, 266 are configured to conform with but be slightly less than the interior of the side rail 110 and slidable therewithin. A pair of opposed outwardly extending walls 272, 274 are integral with the walls 268, 270 and support a vertical wall 276. The wall 276 extends between and is integral with the walls 272, 274 to join the slide block 262 into a continuous structure. The spacing of the walls 272, 274 straddles the threaded portion of the bolt 152 and renders the slide block movable along the slot with the bracket 114. The vertical wall 276 serves as a seat for the threaded end of the bolt 152.

To activate the locking means 150 employing the slide block 262, the bolt 152 is threadingly engaged with the threaded aperture 154. The walls 272, 274 are positioned to straddle the bolt threaded end and the assembly is inserted into the slot 116. The bracket 114 is positioned along the rail and rotation of the bolt 152 in a first direction urges the slide block 262 into engagement with the outer wall 130 locking the bracket in position. Rotation of the bolt 152 in a second direction releases the bracket for movement along the rail.

It is to be appreciated that there has been described herein a slotted side rail with a bracket support slidable cross-rail for an article carrier that can be readily locked in any desired position in a slot formed in the side rail. No unauthorized movement of the bracket is permitted without the hand rotation of a bolt mounted in the bracket for locking and unlocking the bracket.

Having thus described my invention, what I claim is:

1. An adjustable cross-rail assembly for a vehicle-mounted article carrier of the type including a hollow side rail supported upon a vehicle surface, said rail including transversely spaced inner and outer walls, said inner wall including a longitudinally extending slot, a bracket slidably supported within said slot and including a cross-rail supporting portion projecting transversely inwardly of the inner wall of said side rail and means for releasably locking said bracket to said side rail, the improvement comprising:
   (a) said bracket being bifurcated to provide inner and outer portions straddling said side rail slot, a threaded bore formed through said inner and outer portions and extending transversely through said side rail slot;
   (b) a member slidably disposed within said side rail and including a recess adapted to be transversely aligned with said bracket bore, said member being transversely spaced outwardly from the outer portion of said bracket and including an outer surface disposed proximate the outer wall of said side rail; and
   (c) an element extending through and threadable within said bracket bore and projecting within the member recess whereby rotation of said element in one direction respectively causes the outer surface of said member to engage with the outer wall of the side rail and the outer portion of said bracket to engage with the inner wall of said side rail to adjustably fix the longitudinal position of said bracket relative to the side rail.

2. An adjustable cross-rail assembly as set forth in claim 1 wherein the member recess comprises a non-threaded bore coaxially aligned with the bracket bore.

* * * * *